US012603776B2

(12) United States Patent
Hesar et al.

(10) Patent No.: US 12,603,776 B2

(45) Date of Patent: Apr. 14, 2026

(54) METHOD FOR DISTRIBUTING AUTHENTICATABLE SATELLITE DATA BETWEEN ENTITIES

(71) Applicant: Kayhan Space Corp., Boulder, CO (US)

(72) Inventors: Siamak Hesar, Lafayette, CO (US); Araz Feyzi, Ashburn, VA (US); Hyun Kyu Seo, West Chester, PA (US); Derek Strobel, Eugene, OR (US)

(73) Assignee: Kayhan Space Corp., Boulder, CO (US)

( * ) Notice: Subject to any disclaimer, the term of this patent is extended or adjusted under 35 U.S.C. 154(b) by 119 days.

(21) Appl. No.: 18/748,066

(22) Filed: Jun. 19, 2024

(65) Prior Publication Data

US 2024/0430086 A1 Dec. 26, 2024

Related U.S. Application Data

(60) Provisional application No. 63/522,102, filed on Jun. 20, 2023.

(51) Int. Cl.
H04L 9/30 (2006.01)

(52) U.S. Cl.
CPC ..................................... H04L 9/30 (2013.01)

(58) Field of Classification Search
CPC ........................................................ H04L 9/30
See application file for complete search history.

(56) References Cited

U.S. PATENT DOCUMENTS

| | | | | |
|---|---|---|---|---|
| 5,982,897 | A * | 11/1999 | Clark ................. | H04B 7/18593 |
| | | | | 380/278 |
| 7,350,248 | B2 * | 4/2008 | Hensley ............... | A61G 7/0514 |
| | | | | 5/430 |
| 10,552,583 | B2 * | 2/2020 | Piccionelli .............. | G06F 21/10 |
| 2020/0280856 | A1 * | 9/2020 | Syrjarinne ............ | G01S 19/215 |
| 2021/0044348 | A1 * | 2/2021 | Bode ................... | H04L 12/4641 |

FOREIGN PATENT DOCUMENTS

| | | | | | |
|---|---|---|---|---|---|
| CN | 116418597 | A | * | 7/2023 | ........... H04L 63/123 |
| EP | 4478656 | A1 | * | 12/2024 | ........... H04B 10/118 |

* cited by examiner

*Primary Examiner* — Yonas A Bayou

(74) *Attorney, Agent, or Firm* — Run8 Patent Group, LLC; Peter Miller; Marissa Kohrman

(57) ABSTRACT

One variation of a method includes, at an entity: requesting data from a first database; receiving a first data package from the first database; decrypting the first data package via a first public decryption key associated with the first entity; extracting a second data package from the first data package; discarding the second data package in response to failing to decrypt the second data package via a second public decryption key associated with the second entity; extracting a third data package from the first data package; decrypting the third data package via a third public decryption key associated with the third entity; extracting a set of satellite coordinates, corresponding to a satellite, from the third data package; and updating a virtual representation of positions and velocities of a constellation of orbital satellites according to the set of satellite coordinates and exclusive of data contained in the second data package.

20 Claims, 4 Drawing Sheets

METHOD FOR DISTRIBUTING AUTHENTICATABLE SATELLITE DATA BETWEEN ENTITIES

CROSS-REFERENCE TO RELATED APPLICATIONS

This application claims the benefit of U.S. Provisional Application No. 63/522,102, filed on 20 Jun. 2023, which is incorporated in its entirety by this reference.

TECHNICAL FIELD

This invention relates generally to the field of satellite operations and more specifically to a new and useful method for distributing authenticatable satellite data between entities in the field of satellite operations.

DESCRIPTION OF THE EMBODIMENTS

Figure 1:
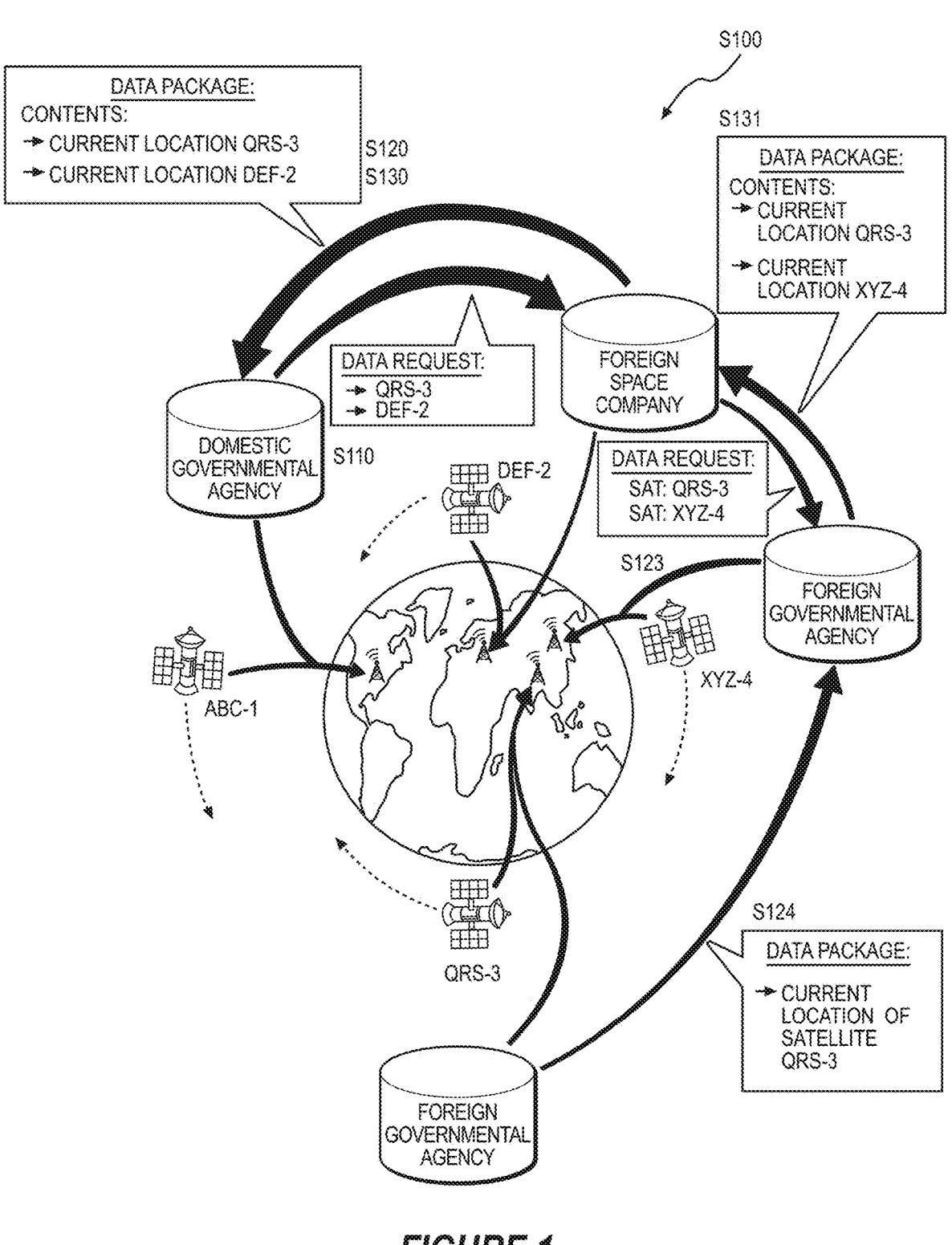
FIG. 1 is a flowchart representation of a method.
Figure 2:
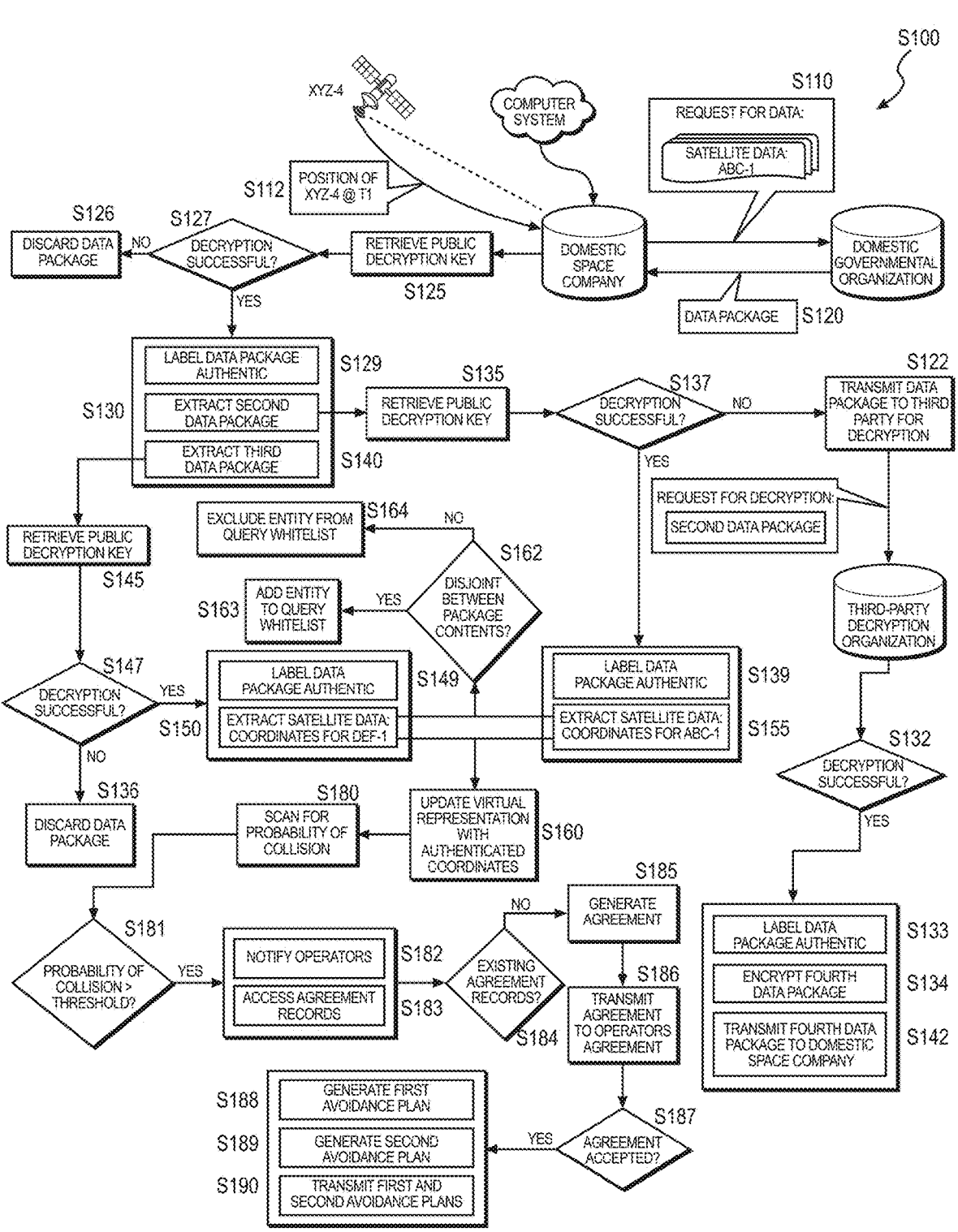
FIG. 2 is a flowchart representation of one variation of the method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1-4, a method S100 includes, at an entity: serving a first query to a first database including a corpus of satellite data in Block Silo; receiving a first data package from the first database, the first data package originating from a first entity in Block S120; retrieving a first public decryption key associated with the first entity in Block S125; and attempting decryption of the first data package via the first public decryption key in Block S127. The method S100 also includes, in response to the first public decryption key decrypting the first data package: identifying the first data package as authenticated in Block S129; extracting a second data package from the first data package, the second data package originating from a second entity in Block S130; retrieving a second public decryption key associated with the second entity in Block S135; and attempting decryption of the second data package via the second public decryption key in Block S137.

The method S100 further includes, in response to the second public decryption key failing to decrypt the second data package: identifying the second data package as unauthenticated; discarding the second data package in Block S136; extracting a third data package from the first data package, the third data package originating from a third entity in Block S140; retrieving a third public decryption key associated with the third entity in Block S145; and attempting decryption of the third data package via the third public decryption key in Block S147.

The method S100 also includes, in response to the third public decryption key decrypting the third data package: identifying the third data package as authenticated in Block S149; extracting a first set of satellite coordinates, corresponding to a first satellite, from the third data package in Block S150; and updating a virtual representation of positions and velocities of a constellation of orbital satellites according to the first set of satellite coordinates and exclusive of data contained in the second data package in Block S160.

1.1 Variation: Data Authentication Via Successful Decryption

As shown in FIGS. 1-4, one variation of the method S100 includes, at an entity: serving a first query to a first database including a corpus of satellite data in Block Silo; receiving a first data package from the first database, the first data package originating from a first entity in Block S120; retrieving a first public decryption key associated with the first entity in Block S125; and attempting decryption of the first data package via the first public decryption key in Block S127. The method S100 also includes, in response to the first public decryption key decrypting the first data package: identifying the first data package as authenticated in Block S129; extracting a first set of satellite coordinates, corresponding to a first satellite, from the first data package in Block S150; extracting a second data package from the first data package, the second data package originating from a second entity in Block S130; retrieving a second public decryption key associated with the second entity in Block S135; and attempting decryption of the second data package via the second public decryption key in Block S137.

This variation of the method S100 further includes, in response to the second public decryption key decrypting the second data package: identifying the second data package as authenticated in Block S139; extracting a second set of satellite coordinates, corresponding to a second satellite, from the second data package in Block S155; and updating a virtual representation of positions and velocities of a first constellation of orbital satellites according to the first set of satellite coordinates and the second set of satellite coordinates in Block S160.

1.2 Variation: Data Discard Responsive to Unsuccessful Decryption

As shown in FIGS. 1-4, a method S100 includes, at an entity: receiving a first data package from a first database, the first data package originating from a first entity in Block Silo; attempting decryption of the first data package via a first public decryption key associated with the first entity in Block S127; and, in response to the first public decryption key decrypting the first data package, extracting a second data package from the first data package, the second data package originating from a second entity in Block S130. The method S100 also includes: attempting decryption of the second data package via a second public decryption key associated with the second entity in Block S137; in response to the second public decryption key failing to decrypt the second data package, discarding the second data package in Block S136; extracting a third data package from the first data package, the third data package originating from a third entity in Block S140; and attempting decryption of the third data package via a third public decryption key associated with the third entity in Block S147.

This variation of the method S100 further includes, in response to the third public decryption key decrypting the third data package: extracting a set of satellite coordinates, corresponding to a satellite, from the third data package in Block S150; and updating a virtual representation of positions and velocities of a constellation of orbital satellites according to the set of satellite coordinates in Block S160.

2. Applications

Generally, the method S100 can be executed by a network of computer systems (or "nodes"), each hosted by or affiliated with an entity, such as a satellite owner, a satellite operator, a satellite support operator, a satellite tracking organization, a satellite-adjacent support system, or a government or private research institution.

In particular, the network of computer systems can execute Blocks of the method S100 to: share satellite mission data with other entities; individually authenticate satellite mission data accessed from other computer systems based on valid decryption of the data with public decryption keys associated with indicated originating computer systems on the network (or their corresponding entities); directly access satellite mission data from other permitted entities, such as prescribed by public policy, international trade law, etc., by directly requesting satellite mission data from their corresponding computer systems; indirectly access satellite mission data from other non-permitted entities, such as prescribed by public policy, international trade law, etc., by requesting satellite mission data from one or a set of other computer systems affiliated with entities subject to different public policy, international trade law, etc.; generate and share data quality assessments (e.g., "confidence scores," "trust scores," and/or "rarity scores") with computer systems affiliated with other trusted entities; enable each entity to update and maintain a comprehensive representation of current and future planned locations, orbits, and/or maneuvers of a constellation of satellites orbiting Earth; and/or plan maneuvers to avoid satellite collisions.

In one application of the method S100, a computer system hosted by or affiliated with a particular entity can share satellite mission data with another entity within the network. In this application, the computer system can: store satellite mission data (e.g., past coordinate, present coordinates, and/or planned future coordinates, orbits, or maneuvers) of satellites owned, operated, and/or supported by the entity; store copies of satellite mission data of satellites owned, operated, and/or supported by other entities affiliated with other computer systems within the network; and publish (or "distribute," "share," "serve") satellite mission data of its own and/or other satellites for access by other entities within the network. In particular, the entity retains (e.g., is assigned) a private encryption key and hosts a corresponding public decryption key accessible by other computer systems in the network. For example, a first computer system affiliated with a first entity can: access satellite mission data of satellites owned, operated, and/or supported by the encrypted satellite mission data entity (hereinafter "originating" satellites); encrypt the satellite mission data according to the private encryption key assigned to the first entity; and publish the encrypted satellite mission data for its originating satellites to a public-facing database affiliated with the entity.

In another application, a computer system affiliated with a particular entity can authenticate satellite mission data accessed from other computer systems. In this implementation, the computer system can: access (or "request") satellite mission data from another entity affiliated with another computer system, the satellite mission data corresponding to satellites owned, operated, and/or supported by the other entity; and access the public decryption key associated with the other entity and corresponding to the private encryption key used to encrypt the satellite mission data. Then, in response to decrypting the satellite mission data, the computer system can identify (or "label") the satellite mission data as authentic and store the satellite mission data in a privately-maintained database affiliated with the entity.

In another application, the computer system can: access (or "request") a data package from another entity, the data package previously accessed from other computer systems within the network by the other entity and including satellite mission data corresponding to satellites owned, operated, and/or supported by other entities within the network; and access the public decryption key associated with the other entity and corresponding to the private encryption key used to encrypt the data package. In response to decrypting the data package, the computer system can identify the data package as authentic, and extract a set of satellite mission data, originating from a different entity, from the data package. Then, the computer system can: access the public decryption key associated with the other entity and corresponding to the private encryption key used to encrypt the set of satellite mission data; and, in response to decrypting the satellite mission data, identify the satellite mission data as authentic, and store the satellite mission data in the privately-maintained database affiliated with the entity. The computer system can repeat this process for each set of satellite mission data included in a particular data package to individually authenticate and/or discard each set of data.

For example, in the foregoing application, a second computer system affiliated with a second entity can: request the encrypted satellite mission data from the first entity; receive a first data package from the first entity, the first data package including the encrypted satellite mission data and a set of satellite mission data originating from a third entity; retrieve the private encryption key affiliated with the first entity; and attempt decryption of the encrypted satellite mission data via the public decryption key affiliated with the first entity. Then, in response to the public decryption key successfully decrypting the first data package, the second computer system can: identify the first data package as authentic; extract the set of satellite mission data, originating from the third entity, from the data package; access a third public decryption key associated with the third entity and corresponding to a third private encryption key used to encrypt the set of satellite mission data; decrypt the satellite mission data via the third public decryption key; and identify the set of satellite mission data as authentic.

In another application, upon identifying a need for satellite mission data, the computer system can access a set of policies governing allowable access requests for the entity affiliated with the computer system. In one variation, upon identifying a need for satellite mission data corresponding to a satellite affiliated with another diplomatic entity, the computer system can directly access the satellite mission data from the diplomatic entity. For example, a first computer system affiliated with a first entity can, upon receiving a query for a set of satellite mission data, from a first operator associated with the first entity: identify a second diplomatic entity, the second entity associated with the set of satellite mission data; access the set of policies governing allowable access requests; and, in response to identifying the second diplomatic entity as a diplomatic entity and the query as complying with the set of policies, request the set of satellite mission data from the second entity.

In another application, upon identifying a need for satellite mission data corresponding to a satellite affiliated with another nondiplomatic entity, the computer system can, indirectly access the satellite mission data from the nondiplomatic entity via another third-party, diplomatic entity. For example, the first computer system affiliated with the first entity can, upon receiving the query for the set of satellite mission data, from the first operator associated with the first entity: identify the second entity, the second entity associated with the set of satellite mission data; access the set of policies governing allowable access requests; and, in response to identifying the second entity as a nondiplomatic entity and the query as failing to comply with the set of policies, identify a third diplomatic entity, the third diplomatic entity maintaining a diplomatic relationship with both the first entity and the second entity. In response to identifying the third entity as a diplomatic entity and identifying a query to the third entity as complying with the set of policies, the first computer system affiliated with the first entity can request the set of satellite mission data from the third entity.

In another application, the computer system can assign one or more scores to a particular set of satellite mission data and/or a particular data package. In one variation, the computer system can assign a confidence score to a particular set of satellite mission data and/or a particular data package based on the accuracy of the data. For example, a first computer system affiliated with a first entity can: receive a set of satellite mission data of a satellite owned, operated, and/or supported by a second entity affiliated with a second computer system within the network, the set of satellite mission data specifying a past location of the satellite at a particular time; access an actual past location of the satellite at the particular time; calculate a confidence score based on a difference between the specified past location and the actual past location; and store the set of satellite mission data associated with the confidence score in a first database affiliated with the first entity.

In another application, the computer system can assign a rarity score to a particular set of satellite mission data and/or a particular data package based on the frequency of a particular data package in the network. For example, a computer system affiliated with an entity can: receive a first data package including a set of satellite mission data of a first satellite owned, operated, and/or supported by a first entity, and a set of satellite mission data of a second satellite owned, operated, and/or supported by a second entity, from the first entity; receive a second data package including the set of satellite mission data of the first satellite, from a third entity; calculate a first confidence score for the set of satellite mission data of the first satellite; and calculate a second confidence score for the set of satellite mission data of the second satellite, the second confidence score lower than the first confidence score based on the lower frequency of the set of satellite mission data of the second satellite in the network.

In another application, the computer system can access data to update a model stored in the database and/or associated with the entity (e.g., a virtual representation, atmospheric density gradient map, etc.). For example, a computer system affiliated with an entity can: receive a first set of satellite mission data from a first entity affiliated with a first computer system; and receive a second set of satellite mission data from a second entity affiliated with a second computer system. Then, in response to identifying the first set of satellite mission data as authentic and the second set of satellite mission data as unauthentic, the computer system can update a virtual representation of positions and velocities of a constellation of orbital satellites according to the first set of satellite mission data and exclusive of the second set of satellite mission data.

In another application, the computer system can access satellite coordinates to predict satellite locations (e.g., past locations, present locations, future locations), and/or access future maneuver plans from another entity to mitigate collision risk between instruments. For example, in response to detecting a probability of collision exceeding a threshold probability of collision from a space object tracking system—such as a space surveillance network operated by a government agency—the computer system can identify: a set of satellites involved in the conjunction; a set of conjunction parameters descriptive of the potential conjunction; and satellite characteristics associated with each satellite. In one variation, the computer system can host a conversation via a digital medium (e.g., via a cooperative messaging application or an internal messaging application). By automatically connecting two satellite operators involved in a conjunction, the computer system reduces the time required to coordinate orbital maneuvers, thereby minimizing the probability and/or risk of collision.

2.1 Satellite Data Sharing within Network

Therefore, the network can facilitate the sharing of authentic and verified (or "scored") data between the network of entities by: facilitating direct interactions between two entities, or indirect interactions between two entities via a third party as governed by public policy and international law specific to the countries or regions occupied by each individual entity; and allowing each entity to access the data hosted on the network to utilize and/or maintain their own instance of the network, thereby allowing increased access to comprehensive data from the network of entities. Furthermore, the network provides data security via the distribution of private encryption keys and public decryption keys by requiring that the corresponding key in each pair of keys is used to encrypt or decrypt data originating from a particular entity. Each data package is encrypted via a private encryption key at each entity that accesses and redistributes the data package, thereby including a list of public decryption keys associated with the entities that have accessed and redistributed each data package. Each data package remains encrypted by the originating entity throughout the network, eliminating the possibility of data alteration and reducing the vulnerability of the data shared with the network.

Generally, the method S100 is described herein as executed by a computer system associated with a private satellite deployment organization (e.g., private companies) located within and subject to laws of a particular country. However, the method can be additionally or alternatively executed by computer systems associated with any organization (e.g., governmental agencies, commercial companies, academic institutions, etc.) subject to the laws, regulations, and/or guidelines of the particular organization.

3. Terms

An "entity" is referred to herein as an organization (e.g., governmental agencies, commercial companies, academic institutions, etc.) configured to contribute to and/or access a corpus of satellite data. A "network of entities" is referred to herein as a collection of individual entities. The network of entities can include one or more entities with known diplomatic relationships and/or one or more entities with known nondiplomatic relationships.

A "database" is referred to herein as a collection of data (e.g., current satellite positions, future satellite maneuver plans, etc.) hosted by and/or associated with a particular entity. A "network of databases" is referred to herein as a collection of databases (hereinafter a "network"), each database, in the network, configured to access the network (e.g., via a direct request to another entity, indirectly via a third-party request, etc.).

A "set of satellite mission data" is referred to herein as satellite ephemeris data (e.g., trajectory data, satellite velocity, past satellite coordinates, current satellite coordinates, future satellite coordinates, etc.) and/or telemetry data (e.g., orbital parameters, satellite health reports, operational status, etc.) corresponding to a particular satellite.

A "data package" is referred to herein as an encrypted package including one or more sets of data. Each data package can include one or more sets of data originating from a particular entity, one or more data packages originating from the particular entity, and/or one or more sets of data packages originating from another entity. Each data package can include a time stamp corresponding to the data contained in the data package. Each data package is encrypted via the private encryption key associated with the entity publishing the data package to the network. Therefore, each data package includes identification of the entity uploading the data package to the network. Furthermore, each data package is encrypted via a private encryption key at each entity that accesses and redistributes the data package. Therefore, each data package can include a list of public decryption keys associated with the entities that have accessed and redistributed the data package.

A "user key" is referred to herein as a pair of keys assigned to an entity. A "private encryption key" is referred to herein as a privately maintained key associated with an entity used to encrypt data published by the entity to the network. A "public decryption key" is referred to herein as a publicly accessible key associated with an entity used to decrypt data published by the entity to authenticate the origin of the data. Generally, contributions to the network are controlled via the distribution of the pair of user keys to each entity. More specifically, a private encryption key is required for each entity contributing to the network, and the corresponding public decryption key is required to decrypt and authenticate the data originating from the entity. For example, a first computer system affiliated with a first entity can encrypt a data package via the private encryption key associated with the entity, and a second computer system affiliated with a second entity can access the public decryption key associated with the entity and decrypt the data package via the public decryption key.

An "authentic package" is referred to herein as a data package successfully decrypted via the public decryption key associated with the entity transmitting and/or publishing the data.

An "unauthentic package" is referred to herein as a data package unsuccessfully decrypted via the public decryption key associated with the entity transmitting and/or publishing the data.

The method S100 is described herein as executed by a remote computer system (e.g., a remote server, hereinafter a "computer system"). However, Blocks of the method S100 can be executed by one or more entities accessing the network, by a local computer system, or by any other computer system—hereinafter a "system."

4. Examples

Blocks of the method S100 can be executed by entities of different types to share, access, validate, and/or score satellite mission data corresponding to originating satellites operated by a particular entity and/or satellites operated by other entities within the network.

4.1 Example 1: Domestic Space Company

In one example, the computer system is hosted by a domestic space company. In this example, the computer system can: receive an authentic data package from a database associated with a foreign space company; and, in response to identifying the data package as authenticated, extract a set of satellite coordinates, corresponding to a satellite operated by the foreign space company, from the authentic data package, the set of satellite coordinates including a specified past location of the satellite at a first time. Then, the computer system associated with the domestic space company, can: access an actual past location of the satellite proximal the first time; and calculate a confidence score based on a difference between the specified past location and the actual past location. Furthermore, the computer system can: encrypt a new data package via a private encryption key associated with the domestic space company, the new data package including the first set of satellite coordinates identified as authenticated and associated with the confidence score; and store the new data package in a publicly available database associated with the domestic space company for access by a population of entities.

4.2 Example 2: Domestic Military Agency

In another example, the computer system is hosted by a domestic military agency. In this example, the computer system can: request a data package from a trusted entity, such as a domestic space company; and receive the authentic data package from the domestic space company. Then, in response to identifying the data package as authenticated, the computer system can: extract the contents of the authentic data package (e.g., a set of satellite coordinates corresponding to a satellite operated by the domestic space company); and update a virtual representation of positions and velocities of a constellation of orbital satellites according to the set of satellite coordinates.

Additionally or alternatively, in the preceding example, the computer system associated with the domestic military agency can: access a first set of satellite coordinates corresponding to a first satellite operated by the domestic military agency; and access a set of policies stored in a database associated with the domestic military agency, the set of policies defining a set of guidelines for sharing information with the network. In response to presence of restrictions on sharing satellite coordinates originating from the domestic military agency, in the set of policies, the computer system can store the first set of satellite coordinates in a privately maintained database associated with the domestic military agency. In response to absence of restrictions on sharing satellite coordinates originating from the domestic space company, in the set of policies, the computer system can: encrypt a first data package via a private encryption key associated with the domestic military agency, the first data package including the set of satellite coordinates; and store the first data package in a publicly available database associated with the domestic military agency for access by the population of entities.

4.2 Example 3: Foreign Space Company

In another example, the computer system is hosted by a first foreign space company. In this example, the computer system can: query the network for available data related to satellites in a particular zone; and receive a first authentic data package from a foreign governmental agency, the foreign governmental agency governing the first foreign space company. In this example, the computer system can access the first authentic data package and extract: a first set of satellite coordinates corresponding to a first satellite operated by the foreign governmental agency, the first set of satellite coordinates assigned a first confidence score of 100%; and a second set of satellite coordinates corresponding to a second satellite operated by the foreign governmental agency, the second set of satellite coordinates assigned a second confidence score of 80%. In response to the second confidence score of 80% falling below a threshold confidence score of 90%, the computer system can discard the second set of satellite coordinates. The computer system can then: receive a second data package from a second foreign space company; and, in response to absence of a relationship between the first foreign space company and the second foreign space company, discard the second data package. The computer system can then: access a set of satellite coordinates corresponding to a satellite operated by the foreign space company; and detect a probability of collision between the satellite and the first satellite based on the set of satellite coordinates and the first set of satellite coordinates. In response to the probability of collision exceeding a threshold probability of collision, the computer system can: generate an avoidance plan for the satellite including a set of avoidance maneuvers; and transmit the avoidance plan to a satellite operator at the foreign space company and associated with the satellite.

4.4 Example 4: Foreign Governmental Agency

In another example, the computer system is hosted by a first foreign governmental agency. In this example, the computer system can: receive a first query, for a set of satellite coordinates corresponding to a satellite operated by a second foreign governmental agency, from a third foreign governmental agency; and access a set of policies, in the network, defining a set of guidelines for sharing information with the third foreign governmental agency. In response to the first query complying with the set of policies and absence of the set of satellite coordinates in a database associated with the private space company, the computer system can: serve a second query, for the set of satellite coordinates, to the second foreign governmental agency; receive an authentic data package from the domestic governmental agency; and transmit a second authentic data package to the third foreign governmental agency, the second authentic data package including the set of satellite coordinates. Then, at the third foreign governmental agency, the computer system can: receive the second authentic data package; extract the set of satellite coordinates from the second authentic data package; and store the second authentic data package in a database associated with the third foreign governmental agency for access by a population of entities governed by the third foreign governmental agency.

5. Publishing Data

Generally, the computer system can publish satellite mission data to a database (e.g., a public-facing database, a private database, etc.) hosted by and/or associated with an entity according to a set of policies set by the entity. For example, the computer system can publish data to the database associated with the entity based on a set of time constraints defined by the entity, a sensitivity level assigned to the entity and/or the data, and/or a criticality level assigned to the entity and/or the data.

In one implementation, the computer system can publish a data package (e.g., satellite trajectory data, satellite locations, planned satellite maneuvers, etc.) to the database associated with the entity based on a set of time constraints defined by the entity. In particular, in this implementation, the computer system can access a set of time constraints defined by the entity, the set of time constraints requiring that each set of satellite coordinates is withheld for 72 hours. In response to capturing a first set of satellite coordinates corresponding to a first satellite, the computer system can: encrypt the data package including the first set of satellite coordinates via a private encryption key associated with the entity; and withhold publication of the data package to the public-facing database until 72 hours after the set of satellite coordinates is captured.

Additionally or alternatively, in another implementation, the computer system can publish a data package to the database associated with the entity based on a sensitivity level assigned to the data package and defined by the entity. In particular, in this implementation, the computer system can access a set of sensitivity levels defined by the entity, the set of sensitivity levels defining a sensitivity threshold for data to be published to the public-facing database. In response to capturing a first set of satellite coordinates corresponding to a first satellite, the computer system can access a sensitivity level assigned to the first set of satellite coordinates; and, in response to the sensitivity level exceeding the sensitivity threshold, the computer system can withhold publication of the first set of satellite coordinates to the public-facing database. Instead, the computer system can publish a data package including the first set of satellite coordinates to the private database. Each entity in the network of entities can implement a similar method to publish data to each respective database. Therefore, each entity in the network of entities is configured to publish and/or withhold publication of data to the public-facing and private versions of the database associated with the entity based on criteria defined by the entity.

5.1 Data Publication by Entity Preference

In one variation, each computer system affiliated with a particular entity can selectively publish and/or withhold publishing data based on the information-sharing preferences of the entity, such as: origin of data, data privacy, a sensitivity level assigned to the data, and/or a required clearance level assigned to the data. In this variation, Blocks of the method S100 can include: accessing a set of satellite coordinates corresponding to a satellite associated with the entity; encrypting a data package via a private encryption key associated with the entity, the data package including the set of satellite coordinates corresponding to the satellite; and storing the data package in a database associated with the entity in Block S112. In particular, in this variation, at an entity, the computer system can: access the set of satellite coordinates corresponding to the satellite associated with the entity; and encrypt a data package via a private encryption key associated with the entity. In this variation, the computer system can encrypt the data package including: a first data package identified as authenticated, the first data package originating from a first entity, and the set of satellite coordinates corresponding to the satellite; and store the data package in a database associated with the entity.

For example, at a domestic governmental agency, the computer system can access: a set of satellite coordinates corresponding to a government satellite operated by the domestic governmental agency and an authentic data package originating from a private space company. The computer system can then package the data for storage and/or publication by encrypting a data package via a private encryption key associated with the domestic governmental agency, the data package including: the authentic data package originating from the private space company; and the set of satellite coordinates corresponding to the government satellite.

Alternatively, in the preceding example, the domestic governmental agency can store and/or publish data originating from the domestic governmental agency (e.g., the set of satellite coordinates corresponding to the government satellite) and withhold publication of data originating from another entity (e.g., the authentic data package originating from the private space company).

Alternatively, in the preceding example, the domestic governmental agency can store and/or publish data originating from another entity (e.g., the authentic data package originating from the private space company) and withhold publication of data originating from the domestic governmental agency (e.g., the set of satellite coordinates corresponding to the government satellite). Therefore, each entity can selectively publish and/or withhold publishing data packages including data originating from the entity and data originating from another entity.

5.2 Data Encryption

Generally, the computer system can encrypt each data package via the private encryption key associated with the entity publishing the data package to the network. Furthermore, each data package is encrypted via a private encryption key at each entity that accesses and redistributes the data package.

In one variation, at an entity, the computer system can access an authentic data package from within another authentic data package. In particular, in this variation, at an entity, the computer system can receive an authentic data package from a first database associated with a first entity, the authentic data package originating from the first entity. The computer system can then: extract a set of satellite coordinates from the authentic data package; extract a first data package from the authentic data package, the first data package originating from the first entity; attempt decryption of the first data package via a first public decryption key associated with the first entity; in response to the first public decryption key decrypting the first data package, identify the first data package as authenticated; and extract a first set of satellite coordinates from the first data package.

For example, at a domestic governmental agency, the computer system can: receive an authentic package from a first database, the authentic data package including a set of satellite coordinates corresponding to a satellite operated by a domestic space company and a first data package, the data package originating from the domestic space company; extract the first data package from the authentic data package, the first data package originating from the domestic space company; attempt decryption of the first data package via a first public decryption key associated with the domestic space company; in response to the first public decryption key decrypting the first data package, identify the first data package as authenticated; and extract a first set of satellite coordinates, corresponding to a first satellite operated by the domestic space company, from the first data package. Therefore, each entity is configured to access and/or decrypt data packages requiring multiple levels of decryption and/or including data from one or more origins.

6. Data Access

As shown in FIG. 1, in one implementation, the computer system can facilitate a query for data between two different entities. In particular, in this implementation, the computer system can: serve a query to a first database from a second database associated with a second entity; and receive a first data package from the first database, the first data package originating from a first entity.

Additionally or alternatively, in one implementation, the computer system can identify data as unauthenticated and/or selectively discard unauthenticated data. In this implementation, Blocks of the method S100 can include: extracting a second data package from the first data package, the second data package originating from a second entity in Block S140; retrieving a second public decryption key associated with the second entity in Block S145; attempting decryption of the second data package via the second public decryption key in Block S147; in response to the second public decryption key failing to decrypt the second data package, identifying the second data package as unauthenticated; and discarding the second data package in Block S136. In particular, in this implementation, in response to receiving the first data package from the first database, the computer system can: retrieve a first public decryption key associated with the first entity; attempt decryption of the first data package via the first public decryption key; in response to the first public decryption key failing to decrypt the first data package, identify the first data package as unauthenticated; and discard the first data package.

Additionally or alternatively, in one implementation, the computer system can identify data as authenticated and/or selectively score data. In particular, in this implementation, in response to the first public decryption key decrypting the first data package, the computer system can identify the first data package as authenticated. Furthermore, in response to identifying the first data package as authenticated, the computer system can assign a confidence score to the first data package.

Additionally or alternatively, in one implementation, the computer system can extract one or more secondary data packages nested within a primary data package. In this implementation, Blocks of the method S100 can include: serving a first query to a first database including a corpus of satellite data in Block S110; receiving a first data package from the first database, the first data package originating from a first entity in Block S120; retrieving a first public decryption key associated with the first entity in Block S125; attempting decryption of the first data package via the first public decryption key in Block S127; and, in response to the first public decryption key decrypting the first data package, identifying the first data package as authenticated in Block S129, extracting a second data package from the first data package, the second data package originating from a second entity in Block S130, and extracting a third data package from the first data package, the third data package originating from a third entity in Block S140.

In particular, in this implementation, in response to the first public decryption key decrypting the first data package, the computer system can: extract a second data package from the first data package, the second data package originating from a third entity; retrieve a third public decryption key associated with the third entity; attempt decryption of the second data package via the third public decryption key; and, in response to the third public decryption key decrypting the second data package, identify the second data package as authenticated.

For example, at a domestic governmental agency, the computer system can: serve a query to a first database associated with a domestic space company; receive a first authentic data package from the domestic space company, the first authentic data package including a first set of satellite coordinates corresponding to a first satellite operated by the domestic space company; extract a second unauthentic data package nested within the first data package, the second data package originating from a foreign space company; in response to identifying the second data package as unauthentic, discard the second data package; and extract a third authentic data package nested within the first authentic data package, the third authentic data package originating from a second domestic governmental agency and including a third set of satellite coordinates corresponding to a third satellite operated by the domestic governmental agency. Then, the computer system can update a virtual representation of positions and velocities of a constellation of orbital satellites according to the first set of satellite coordinates, the third set of satellite coordinates, and exclusive of data contained in the second unauthentic data package.

6.1 Variation: Third Party Data Access

Figure 4:
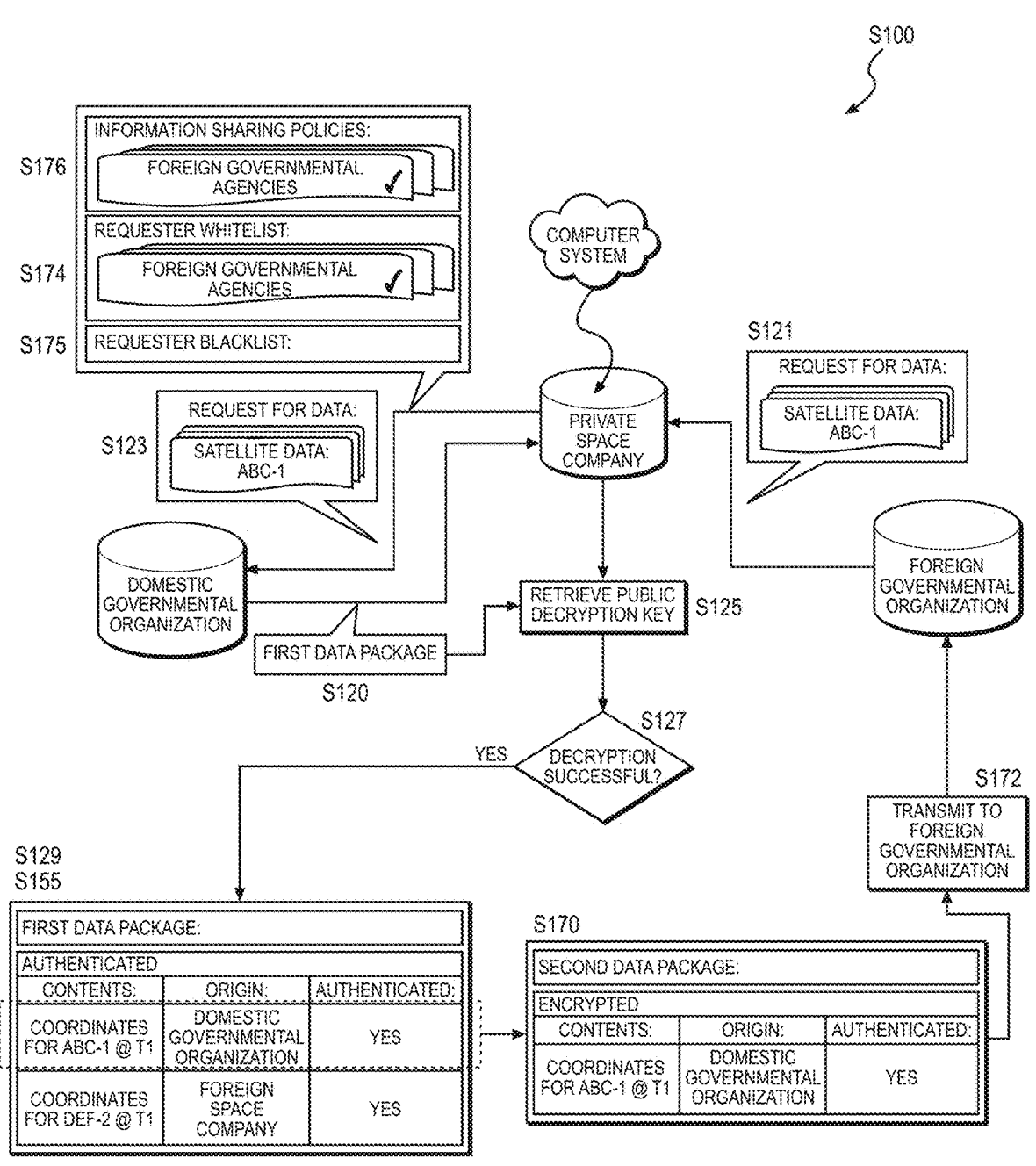
FIG. 4 is a flowchart representation of one variation of the method.

As shown in FIGS. 1 and 4, in one variation, the network can facilitate interaction between two entities, such as: two nondiplomatic entities with absence of an extant relationship due to governmental policy; two diplomatic entities without an existing data sharing treaty (e.g., due to governmental policy); an entity subject to local laws that prevent direct data sharing with a second entity; and an entity with greater resources and an entity with less resources, etc. via a third-party entity.

In this variation, Blocks of the method S100 can include: receiving a query, for a set of satellite coordinates corresponding to a satellite, from a first entity in Block S121; in response to absence of the set of satellite coordinates in a database associated with the entity, serving a second query, for the set of satellite coordinates, to the database, associated with the entity in Block S123; receiving the data package from the database associated with the entity in Block S120; retrieving a public decryption key associated with the entity in Block S125; and attempting decryption of the data package via the public decryption key in Block S127. In this variation, Blocks of the method S100 can further include, in response to the public decryption key decrypting the data package: identifying the data package as authenticated in Block S129; extracting the set of satellite coordinates, corresponding to the satellite, from the data package in Block S155; encrypting a data package via a private encryption key, the data package including the data package identified as authenticated in Block S170; and transmitting the data package to the second entity in Block S172.

In particular, in this variation, at an entity, the computer system can: receive a first query, for a set of satellite coordinates corresponding to a satellite, from a first entity; and, in response to absence of the set of satellite coordinates in a database associated with the entity, serve a second query, for the set of satellite coordinates, to a second database. The computer system can then: receive an authentic data package from the second database, the authentic data package originating from a second entity; encrypt a first data package via a private encryption key associated with the entity, the first data package including the authentic data package; and transmit the first data package to the first entity. For example, at a private space company, the computer system can: receive a first query, from a foreign governmental agency, for a set of satellite coordinates corresponding to a satellite operated by a domestic governmental agency; and access a set of policies, in the network, defining a set of guidelines for sharing information with the foreign governmental agency. In response to the first query complying with the set of policies based on presence of a nondiplomatic relationship between the foreign governmental agency and the domestic governmental agency, presence of a diplomatic relationship between the private space company and the domestic governmental agency, and presence of a diplomatic relationship between the private space company and the foreign governmental agency, the private space company can accept the first query. In response to absence of the set of satellite coordinates in a database associated with the private space company, the computer system can: serve a second query, for the set of satellite coordinates, to a database associated with the domestic governmental agency; receive an authentic data package from the domestic governmental agency; encrypt a new data package via a private encryption key associated with the private space company, the new data package including the authentic data package; and transmit the new data package to the foreign governmental agency.

Alternatively, in the preceding example, in response to the first query failing to comply with the set of policies, the private space company can deny the first query and/or transmit the set of policies to the foreign governmental agency. Therefore, the network can increase access to data by allowing each entity, in the network of entities, to directly access all data contained in the network via a direct request to another entity and/or an indirect request to another entity via a third-party entity (i.e., regardless of the relationship between the entity requesting data and the entity transmitting the data).

6.2 Variation: Query List

In one variation, each entity, in the network of entities, can store preferred entities in a query list, such as: trusted entities, entities with unique sets of data, entities with complete sets of data, etc. In this variation, Blocks of the method S100 can include: disjoint between a first data package originating from a first database and a second data package originating from a second database in Block S162; in response to disjoint between sets of satellite coordinates stored in the first database and the second database, appending the first database and the second database to a query list in Block S163; and, in response to the first data package fully containing satellite coordinates contained within the second data package, excluding the second database from the query list in Block S164.

In particular, in this variation, at an entity, the computer system can: receive a first authentic data package from a first database, the first authentic data package originating from a first entity; extract a first set of satellite coordinates, corresponding to a first satellite, from the first authentic data package; receive a second authentic data package from a second database, the second authentic data package originating from a second entity; and extract a second set of satellite coordinates from the second authentic data package. In response to disjoint between sets of satellite coordinates stored in the first database and the second database, the computer system can append the first database and the second database to a query a list stored in a database associated with the entity.

Additionally or alternatively, at the entity, the computer system can: extract a third set of satellite coordinates from the second data package; receive a third authentic data package from a third database, the third data package originating from a third entity; and extract the third set of satellite coordinates from the third authentic data package. In response to the second authentic data package fully containing satellite coordinates contained within the third authentic data package, the computer system can exclude the third database from the query list.

For example, at a first domestic governmental agency, the computer system can: receive a first authentic data package from a first database, the first authentic data package originating from a foreign governmental agency; and extract a first set of satellite coordinates, corresponding to a first satellite operated by the foreign governmental agency, from the first authentic data package. Then, the computer system can: receive a second authentic data package from a second database, the second authentic data package originating from a second domestic governmental agency; and extract a second set of satellite coordinates, corresponding to a second satellite operated by the second domestic governmental agency, from the second authentic data package. In response to disjoint between sets of satellite coordinates stored in the first database and the second database, the computer system can append the foreign governmental agency and the second domestic governmental agency to a query list stored in a database associated with the first domestic governmental agency.

Alternatively, in the preceding example, at the first domestic governmental agency, the computer system can: extract a third set of satellite coordinates, corresponding to a third satellite operated by a private space company, from the second data authentic package; receive a third authentic data package from a third database, the third authentic data package originating from a private space company; and extract the third set of satellite coordinates from the third authentic data package. In response to the second authentic data package fully containing satellite coordinates contained within the third authentic data package, the computer system at the first domestic governmental agency can exclude the private space company from the query list.

Alternatively, in the preceding example, at the first domestic governmental agency, the computer system can: access a first time difference between the recordation and publication of the third set of satellite coordinates, the first time difference associated with the third set of satellite coordinates accessed from the second domestic governmental agency; and access a second time difference, less than the first time difference, between the recordation and publication of the third set of satellite coordinates, the second time difference associated with the third set of satellite coordinates accessed from the private space company. In response to the database associated with the second domestic governmental agency containing a unique set of data (i.e., the second set of satellite coordinates), and the database associated with the private space company containing newer data (i.e., the third set of satellite coordinates recorded at the second time difference), the computer system at the first domestic governmental agency can append the second domestic governmental agency and the private space company to the query list. Therefore, a particular entity can append a preferred query list with a second entity if the data received from the second entity: is unique (i.e., not supplied by another entity on the network already specified in the preferred query list); is comprehensive (e.g., includes a large proportion of data that a particular entity may otherwise necessarily call from two or more other entities); and exhibits low latency (i.e., is available sooner than the same data is available from other entities within the network). Similarly, the particular entity can remove a third entity from the preferred query list if data received from the third entity: is consistently not unique (i.e., already supplied by another entity on the network already specified by in the preferred query list); is consistently incomplete (e.g., excludes data supplied by other entities within the network); and exhibits high latency (i.e., is available later than the same data is available from other entities within the network).

6.3 Variation: Decryption Support

Additionally or alternatively, the network can facilitate requests for authentication between an entity with less resources and an entity with greater resources. For example, the method S100 can include: encrypting a data package via a private encryption key associated with the entity, the data package including an unauthenticated data package originating from a second entity, and transmitting the data package to a first entity in Block S122; at the first entity, receiving the data package from a database associated with the entity, retrieving a public decryption key associated with the second entity, and attempting decryption of the unauthenticated data package via the public decryption key in Block S132; in response to decrypting the unauthenticated data package, identifying the data package as authenticated in Block S133; encrypting a second data package via a second private encryption key associated with the entity, the second data package including the unauthenticated data package labeled as authenticated in Block S134; and transmitting the second data package to the first entity in Block S142.

In particular, in this variation, a computer system affiliated with an entity can: receive a data package from a first database, the first data package originating from a first entity, and a request for assistance in decrypting the contents of the data package. Then, the computer system can: extract a second data package, identified as unauthenticated by the first entity, from the first data package, the second data package originating from a second entity; and, in response to decrypting the second data package via a public decryption key associated with the second entity, transmit the second data package, labeled as authenticated by the entity, to the first database.

For example, at a domestic governmental agency (e.g., greater decryption resources), the computer system can: receive a data package from a trusted private space company (e.g., less decryption resources), the data package including a set of satellite mission data obtained from foreign space company, and a request for assistance in decrypting the set of satellite mission data. Then, the computer system at the domestic governmental agency can: attempt decryption of the set of satellite mission data; and, in response to the decrypting the set of satellite mission data, transmit a new data package, including the set of satellite mission data labeled as authenticated by the domestic governmental agency, to the private space company. Therefore, each computer system affiliated with a particular entity is configured to access the resources of another entity, in the network of entities, to promote data authentication and sharing.

6.4 Filtering Data

Generally, each entity, in the network of entities, can access, authenticate, filter and/or store internal copies of the data received from other entities in the network based on a set of criteria defined by the entity. For example, each entity can filter data based on the entity that the data originates from, a confidence score assigned to the data, a rarity score assigned to the data, and/or the data identified as authenticate or unauthenticated.

In one implementation, at an entity, the computer system can selectively accept and/or discard data based on a set of criteria defined for by the entity. In particular, in this implementation, at the entity, the computer system can: serve a query to a first database; and receive a data package from the first database, the data package originating from a first entity. In this implementation, the computer system can access the data package and extract: a first data package originating from the first entity, the first data package identified as unauthenticated; a second data package originating from a second entity; a third data package originating from a third entity, the third data package assigned a confidence score (e.g., 80%); and a fourth data package originating from a fourth entity, the fourth data package assigned a rarity score (e.g., 50%). Then, the computer system can: in response to identifying the first data package as unauthenticated, discard the first data package; in response to identifying the second entity as a nondiplomatic entity, discard the second data package; in response to the confidence score associated with the third data package exceeding a threshold confidence score, store the third data package in a database associated with the entity; and, in response to the rarity score associated with the fourth data package falling below a threshold rarity score, discard the fourth data package.

Alternatively, in the preceding implementation, the computer system can selectively accept and discard data based on an alternative set of criteria defined by the entity. In particular, in this implementation, at the entity, the computer system can: in response to identifying the first data package as unauthenticated, store the first data package in the database associated with the entity; in response to identifying the second entity as a nondiplomatic entity, store the second data package in the database; in response to the confidence score associated with the third data package falling below a threshold confidence score, store the third data package in the database; and, in response to the rarity score associated with the fourth data package falling below a threshold rarity score, store the fourth data package in the database. Therefore, the network allows each entity to access data based on the entity preferences for the authenticity of a particular data package, a confidence score assigned to the data, a rarity score assigned to the data.

7. Access Control

Generally, at each entity, the computer system can control access to the database associated with the entity based on a set of criteria defined by the entity. For example, the computer system can accept and/or deny requests for data based on: the origin of the requesting entity; presence of the requesting entity on a requester whitelist; presence of the requesting entity on a requester blacklist; a security clearance level assigned to the requesting entity, etc.

7.1 Requester Whitelist

In one variation, the computer system can control access to the database based on: presence of the requesting entity on a requester whitelist, the requester whitelist representing a set of trusted entities—such as previously approved for requesting data from the entity—defined by the entity; and presence of the requesting entity on a requester blacklist, the requester blacklist representing a set of untrusted entities—not approved for or banned from accessing data from the entity—defined by the entity. In this variation, Blocks of the method S100 can include: accessing a requester whitelist including a list of trusted entities in Block S174; accessing a requester blacklist including a list of untrusted entities in Block S175; accessing a set of information sharing policies governing allowable access requests in Block S176; and, in response to receiving a query for a set of satellite coordinates from a first entity on the requester whitelist in Block S123, transmitting a data package to the first entity in Block S120.

In particular, at the entity, the computer system can: access a requester whitelist including a list of trusted entities; and access a requester blacklist including a list of untrusted entities. In response to receiving a first query, for a first set of satellite coordinates and a second set of satellite coordinates, from a first entity the computer system can then: access a first required clearance level assigned to the first set of satellite coordinates; and access a second required clearance level, higher than the first required clearance level, assigned to the second set of satellite coordinates. In response to presence of the first entity on the requester whitelist, the computer system can then: access a first clearance level assigned to the first entity and defined in the list of trusted entities; in response to the first clearance level exceeding the first required clearance level and the second required clearance level, encrypt a data package via a private encryption key associated with the entity, the data package including the first set of satellite coordinates and the second set of satellite coordinates; and transmit the data package to the first entity.

Additionally or alternatively, at the entity, the computer system can receive a second query, for the first set of satellite coordinates and the second set of satellite coordinates, from a second entity. In response to presence of the second entity on the requester whitelist the computer system can then: access a second clearance level assigned to the second entity and defined in the list of trusted entities; in response to the second clearance level exceeding the first required clearance level and falling below the second required clearance level, encrypt the data package via the private encryption key associated with the entity, the data package including the first set of satellite coordinates; and transmit the data package to the second entity.

Additionally or alternatively, at the entity, the computer system can: receive a third query from a third entity; and, in response to presence of the third entity on the requester blacklist, deny the third query. Therefore, the computer system can approve and/or deny each individual request for data based on the presence of the requesting entity on a requestor whitelist or a requestor blacklist, and/or the security clearance level assigned to the requesting entity.

8. Scoring Data

Figure 3:
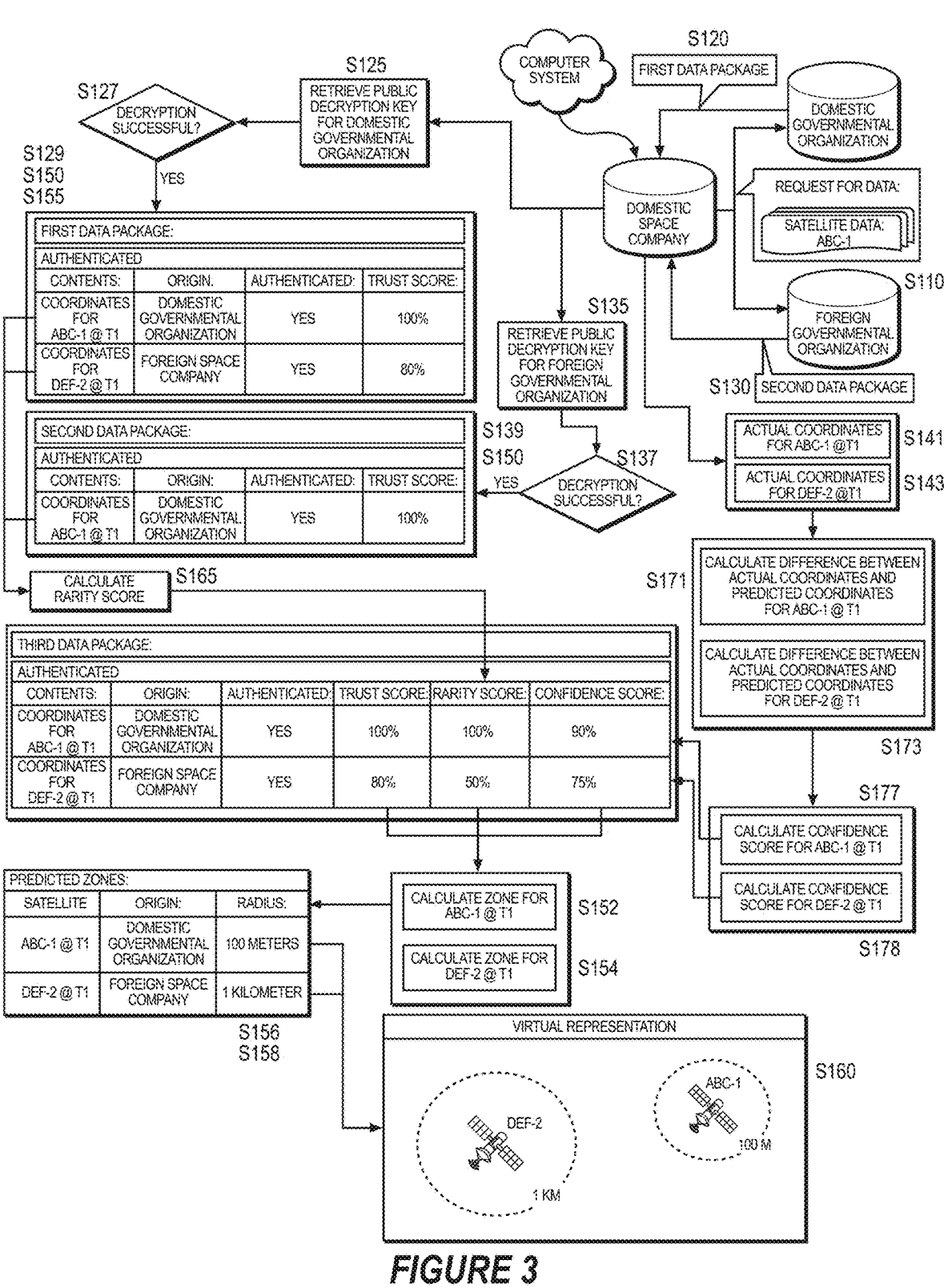
FIG. 3 is a flowchart representation of one variation of the method.

Generally, data contained within the network can be assigned one or more scores, such as a confidence score, and/or a rarity score. As shown in FIG. 3, a zone representing possible locations of a particular satellite can be calculated based on one or more scores.

8.1 Confidence Score

As shown in FIG. 3, in one variation, at each entity, the computer system can assign and/or access a confidence score associated with a particular data package, the confidence score representing the accuracy of the data contained in the data package. In this variation, Blocks of the method S100 can include: receiving a data package from a database associated with an entity in Block S120; in response to identifying the data package as authenticated in Block S129, extracting a first set of satellite coordinates including a first specified past location of a first satellite at a first time and a first trust score in Block S150; and extracting a second set of satellite coordinates including a second specified past location of a second satellite at the first time and a second trust score in Block S155. Blocks of the method S100 can further include: accessing a first actual past location proximal the first time in Block S141; accessing a second actual past location proximal the first time in Block S143; calculating a first difference between the first specified past location and the first actual past location in Block S171; calculating a second difference between the second specified past location and the second actual past location in Block S173; calculating a first confidence score for the first set of satellite coordinates based on the first difference in Block S177; and calculating a second confidence score for the second set of satellite coordinates based on the second difference in Block S178.

In particular, in this variation, the computer system can: receive a first authentic data package from a first database, the first data package originating from a first entity; and extract a set of satellite coordinates, corresponding to a satellite, from the first authentic data package, the set of satellite coordinates including a specified past location of the satellite at a first time. Then, the computer system can: access an actual past location of the satellite proximal the first time; calculate a confidence score based on a difference between the specified past location and the actual past location; encrypt a data package via a private encryption key associated with the entity, the data package including the set of satellite coordinates associated with the confidence score; and store the data package in a database associated with the entity for access by a network of entities.

For example, at a public space company, the computer system can: receive a first authentic data package from a database associated with a domestic governmental agency, the first authentic data package originating from the domestic governmental agency; and extract a first set of satellite coordinates, corresponding to a first satellite controlled by the domestic governmental agency, from the first authentic data package, the set of satellite coordinates including a specified past location of the satellite at a first time. Then, at the public space company, the computer system can: access an actual past location of the satellite proximal the first time; calculate a first confidence score of 100% based on negligible difference between the specified past location and the actual past location; encrypt a data package via a private encryption key associated with the public space company, the data package including the first set of satellite coordinates associated with the first confidence score; and store the data package in a database associated with the public space company for access by the network of entities.

Alternatively, in the preceding example, in response to detecting a significant difference between the specified past location and the actual past location, the computer system can calculate a first confidence score of 10% for the first set of satellite coordinates.

Alternatively, in the preceding example, the computer system can: extract a second authentic data package from the first authentic data package, the authentic second data package originating from a foreign governmental agency; extract a second set of satellite coordinates, corresponding to a second satellite operated by the foreign governmental agency, from the second authentic data package; retrieve a first confidence score of 90% for the first set of satellite coordinates; and retrieve a second confidence score of 50% for the second set of satellite coordinates, the second confidence score less than the first confidence score. Then, to update a virtual representation of positions and velocities of a constellation of orbital satellites, the computer system can: calculate a first radius of 100 meters, the first radius proportional to the first confidence score of 90%; calculate a second radius of one kilometer, the second radius proportional to the second confidence score of 50%; define a first zone, characterized by the 100-meter radius and representing possible locations of the first satellite, in the virtual representation; define a second zone, characterized by the one-kilometer radius and representing possible locations of the second satellite, in the virtual representation; and update the virtual representation based on the first zone and the second zone. Therefore, the network can promote access to verified data between entities, thereby mitigating collision risk between instruments.

8.1.1 Variation: Confidence Score Based on Trust Score

Additionally or alternatively, in one variation, each entity can assign and/or access a confidence score associated with a particular data package. In particular, in this variation, at an entity, the computer system can: receive a first authentic data package from a first database, the first data package originating from a first entity; extract a first set of satellite coordinates, corresponding to a first satellite, from the first authentic data package; extract a second authentic data package from the first data package, the second authentic data package originating from a second entity; and extract a second set of satellite coordinates, corresponding to a second satellite, from the second authentic data package. Then, the computer system can: retrieve a first trust score assigned to the first entity by the entity; calculate a first confidence score for the first set of satellite coordinates based on the first trust score; retrieve a second trust score for the second set of satellite coordinates from the first authentic data package, the second trust score calculated by the first entity, associated with the second authentic data package, and stored in the first authentic data package; and calculate a second confidence score for the second set of satellite coordinates, the second confidence score less than the first confidence score, based on a combination of the first trust score and the second trust score.

For example, at a domestic governmental agency, the computer system can: receive a first authentic data package from a domestic space company, the first data package including a first set of satellite coordinates, corresponding to a first satellite operated by the domestic space company; and receive a second authentic data package including a second set of satellite coordinates, corresponding to a second satellite operated by the foreign governmental agency, the second authentic data package originating from a foreign governmental agency. The computer system can then: retrieve a first trust score of 75% assigned to the domestic space company by the domestic governmental agency; calculate a first confidence score of 90% for the first set of satellite coordinates based on the first trust score; retrieve a second trust score of 25% for the second set of satellite coordinates from the first authentic data package, the second trust score calculated by the domestic space company, associated with the second authentic data package, and stored in the first data package; and calculate a second confidence score of 50% for the second set of satellite coordinates based on a combination of the first trust score of 75% assigned to the domestic space company and the second trust score of 25% calculated by the domestic space company.

Alternatively, in the preceding example, at a first time, the computer system can: receive an initial authentic data package from the domestic space company; extract an initial set of satellite coordinates, corresponding to an initial predicted location of the first satellite at an initial time succeeding the first time, from the initial authentic data package; access a verified location of the first satellite at the initial time; calculate a first trust score of 50% based on a difference between the initial predicted location and the verified location; and assign the first trust score of 50% to the domestic space company. Then, at a second time succeeding the first time, the computer system can receive the first authentic data package from the domestic space company. The computer system can then access the first authentic data package including: the first set of satellite coordinates corresponding to a first predicted location of the first satellite at a third time succeeding the second time; and the second set of satellite coordinates corresponding to the second satellite operated by the foreign governmental agency. The computer system can then retrieve a second trust score of 30% assigned to the foreign governmental agency by the domestic governmental agency. To update a virtual representation of positions and velocities of a constellation of orbital satellites, the computer system can then: calculate a first radius of two kilometers, the first radius proportional to the first trust score of 50%; calculate a second radius of ten kilometers, the second radius proportional to the second trust score of 30%; define a first zone, characterized by the two-kilometer radius and representing possible locations of the first satellite around the first predicted location of the first satellite at the first time, in the virtual representation; define a second zone, characterized by the ten-kilometer radius and representing possible locations of the second satellite, in the virtual representation; and update the virtual representation based on the first zone and the second zone. Therefore, each computer system in the network can: calculate a confidence score for a particular data package based on one or more confidence scores assigned to the data package by other entities; and store an internal copy of a scored data package.

8.2 Rarity Score

Additionally or alternatively, in one variation, the computer system can assign a rarity score (e.g., a percentage) to each data package, the rarity score representing the frequency of a particular data package in the network. In this variation, Blocks of the method S100 can include: receiving a first data package from a first database associated with a first entity in Block S120; in response to identifying the first data package as authenticated in Block S129, extracting a first set of satellite coordinates corresponding to a first satellite in Block S150, and extracting a second set of satellite coordinates corresponding to a second satellite in Block S155; receiving a second data package from a second database associated with a second entity in Block S130; retrieving a second public decryption key associated with the second entity in Block S135; attempting decryption of the second data package via the second public decryption key in Block S137; and, in response to the second public decryption key decrypting the second data package, identifying the second data package as authenticated in Block S139, and extracting the first set of satellite coordinates corresponding to the first satellite in Block S150. In this variation, Blocks of the method S100 can further include: calculating a first rarity score for the first set of satellite coordinates based on presence of the first set of satellite coordinates in the first data package, and presence of the first set of satellite coordinates in the second data package; and calculating a second rarity score, less than the first rarity score, for the second set of satellite coordinates based on presence of the first set of satellite coordinates in the first data package, and absence of the second set of satellite coordinates in the second data package in Block S165.

In particular, in this variation, at the entity, the computer system can: serve a first query to a first database; receive a first authentic data package from the first database, the first data package originating from a first entity; extract a first set of satellite coordinates from the first authentic data package; extract a second authentic data package from the first data package, the second data package originating from a second entity; and extract a second set of satellite coordinates from the second authentic data package. The computer system can then: serve a second query to a third database; receive a third authentic data package from the third database, the third authentic data package originating from a third entity; and extract the first set of satellite coordinates from the third data package. The computer system can then: calculate a first rarity score for the first set of satellite coordinates based on presence of the first set of satellite coordinates in the first authentic data package and presence of the first set of satellite coordinates in the third authentic data package; and calculate a second rarity score, less than the first rarity score, for the second set of satellite coordinates based on presence of the first set of satellite coordinates in the first authentic data package and absence of the second set of satellite coordinates in the third authentic data package.

For example, at a domestic space company, the computer system can: serve a first query to a first database; receive a first authentic data package from the first database, the first data package originating from a foreign governmental agency; extract a first set of satellite coordinates, corresponding to a first satellite operated by the foreign governmental agency, from the first authentic data package; extract a second authentic data package from the first authentic data package, the second authentic data package originating from a foreign space company; and extract a second set of satellite coordinates, corresponding to a second satellite operated by the foreign space company, from the second authentic data package. The computer system can then: serve a second query to a third database; receive a third authentic data package from the third database, the third authentic data package originating from a domestic governmental agency;

and extract the first set of satellite coordinates, corresponding to the first satellite operated by the foreign governmental agency, from the third authentic data package. The computer system can then: calculate a first rarity score of 75% for the first set of satellite coordinates based on presence of the first set of satellite coordinates in the first authentic data package and presence of the first set of satellite coordinates in the third authentic data package; and calculate a second rarity score of 25% for the second set of satellite coordinates based on presence of the first set of satellite coordinates in the first authentic data package and absence of the second set of satellite coordinates in the third authentic data package.

Additionally or alternatively, in the preceding example, the computer system can update a virtual representation of positions and velocities of a constellation of orbital satellites based on the first rarity score and the second rarity score. Then, in order to update the virtual representation, the computer system can: calculate a first radius of 100 meters proportional to the first rarity score of 75%; calculate a second radius of one kilometer proportional to the second rarity score of 25%; define a first zone, exhibiting the 100-meter radius and representing possible locations of the first satellite, in the virtual representation; define a second zone, exhibiting the one-kilometer radius and representing possible locations of the second satellite, in the virtual representation; and update the virtual representation based on the first zone and the second zone. Therefore, the network can provide each entity access to the rarity score assigned to each data package, thereby allowing each entity to access the frequency of a particular data package in the network.

9. Data Applications

Generally, each entity is configured to access the data contained in the network to improve availability of satellite data in the network of entities. For example, a particular entity can: access data to update a model stored in the database and/or associated with the entity (e.g., a virtual representation, atmospheric density gradient map, etc.), access satellite coordinates to predict satellite locations (e.g., past locations, present locations, future locations), and/or access future maneuver plans from another entity to mitigate collision risk between instruments.

9.1 Satellite Map+Virtual Satellite Position Representation

In one implementation, an entity can access the network to update a virtual representation stored in the database and/or associated with the entity. In this implementation, at an entity, the computer system can: receive a first authentic data package from a first database, the first authentic data package originating from a first entity and including a second unauthentic data package, the second unauthentic data package originating from a second entity; discard the second data package; and extract a first set of satellite coordinates, corresponding to a first satellite, from the first authentic data package. Then, the computer system can update a virtual representation of positions and velocities of a constellation of orbital satellites according to the first set of satellite coordinates and exclusive of data contained in the second unauthentic data package.

Alternatively, the computer system can: receive a first authentic data package from the first database, the first authentic data package originating from a first entity and including a second authentic data package, the second authentic data package originating from a second entity;

extract a first set of satellite coordinates, corresponding to a first satellite, from the first data authentic package; and extract a second set of satellite coordinates, corresponding to a second satellite, from the second authentic data package. Then, the computer system can update a virtual representation of positions and velocities of a first constellation of orbital satellites according to the first set of satellite coordinates and the second set of satellite coordinates. In this variation, Blocks of the method S100 can include: calculating a first radius for a first satellite based on a first rarity score, a first confidence score, and a first trust score assigned to a first set of satellite coordinates in Block S152; calculating a second radius for a second satellite based on a second rarity score, a second confidence score, and a second trust score assigned to a second set of satellite coordinates in Block S154; defining a first zone, exhibiting the first radius and representing possible locations of the first satellite, in the virtual representation in Block S156; defining a second zone, exhibiting the second radius and representing possible locations of the second satellite, in the virtual representation in Block S158; and updating the virtual representation based on the first zone and the second zone in Block S160.

For example, at a domestic governmental agency, the computer system can: receive a first authentic data package from a first database, the first authentic data package originating from a foreign governmental agency and including a second unauthentic data package, the second unauthentic data package originating from a foreign space company; and discard the second unauthentic data package; extract a first set of satellite coordinates, corresponding to a first satellite operated by the foreign governmental agency, from the first authentic data package. Then, the computer system can update a virtual representation of positions and velocities of a constellation of orbital satellites according to the first set of satellite coordinates and exclusive of data contained in the second unauthentic data package.

Alternatively, the computer system can: receive a first authentic data package from a first database, the first authentic data package originating from a foreign governmental agency and including a second authentic data package, the second authentic data package originating from a foreign space company; extract a first set of satellite coordinates, corresponding to a first satellite operated by the foreign governmental agency, from the first authentic data package; and extract a second set of satellite coordinates, corresponding to a second satellite operated by the foreign space company, from the second authentic data package. Then, the computer system can update a virtual representation of positions and velocities of a first constellation of orbital satellites according to the first set of satellite coordinates and the second set of satellite coordinates. In one example, the computer system can update a visual representation of positions and velocities of the first constellation of orbital satellites according to the first set of satellite coordinates and the second set of satellite coordinates. In another example, the computer system can update a population of orbits of positions, velocities, attitudes, altitudes, and elliptical paths of the first constellation of orbital satellites according to the first set of satellite coordinates and the second set of satellite coordinates.

9.2 Collision Avoidance

In one implementation, the computer system implements blocks of the method to access, validate, score, and store copies of satellite mission data of other satellites operated by other entities. The computer system—and another connected system—can then: compile satellite mission data into a map representing past, present, and/or forecast future positions, orbits, and/or speeds of a population of satellites operated by various entities in the network; and selectively plan and execute navigational actions for each originating satellite in order to avoid collisions with other satellites.

In this variation, Blocks of the method S100 can include: forecasting an intersection between the flight path of the first satellite and a zone representing possible locations of the second satellite based on the first set of satellite coordinates and the second set of satellite coordinates in Block S180; detecting the probability of collision exceeding a threshold probability of collision in Block S181; notifying a first satellite operator associated with the first satellite of the probability of collision and notifying a second satellite operator associated with the second satellite of the probability of collision in Block S182; accessing an agreement record for a set of satellite operators including the first satellite operator and the second satellite operator in Block S183; in response to detecting that no agreement exists between the first satellite operator and the second satellite operator in Block S184, generating an operative agreement based on a first set of satellite characteristics and a second set of satellite characteristics in Block S185; and transmitting an agreement message including a tentative agreement and an acceptance element to the first satellite operator and the second satellite operator in Block S186. In this variation, Blocks of the method S100 can further include, in response to acceptance of the operative agreement by the first satellite operator and the second satellite operator via the acceptance element in Block S187: generating a first avoidance plan for the first satellite including a first set of avoidance maneuvers in Block S188; generating a second avoidance plan for the second satellite including a second set of avoidance maneuvers in Block S189; and transmitting the first avoidance plan to the first satellite operator and transmitting the second avoidance plan to the second satellite operator in Block S190.

In particular, in this implementation, the computer system can forecast an intersection between the flight path of the first satellite and a zone representing possible locations of the second satellite based on the first set of satellite coordinates and the second set of satellite coordinates and, in response to the probability of collision exceeding a threshold probability of collision: notify a first satellite operator associated with the first satellite of the probability of collision; notify a second satellite operator associated with the second satellite of the probability of collision; and access an agreement record for a set of satellite operators including the first satellite operator and the second satellite operator. In response to detecting that no agreement exists between the first satellite operator and the second satellite operator, the computer system can generate an operative agreement based on a first set of satellite characteristics and a second set of satellite characteristics and transmitting an agreement message including a tentative agreement and an acceptance element to the first satellite operator and the second satellite operator. In response to acceptance of the operative agreement by the first satellite operator and the second satellite operator via the acceptance element, the computer system can: generate a first avoidance plan for the first satellite including a first set of avoidance maneuvers; generate a second avoidance plan for the second satellite including a second set of avoidance maneuvers; transmit the first avoidance plan to the first satellite operator; and transmit the second avoidance plan to the second satellite operator.

In one implementation, at an entity, the computer system can: identify an orbital conjunction (hereinafter "conjunction") between a satellite operator and space debris and/or between two satellite operators; notify the satellite operators involved in the conjunction; facilitate an agreement between operators when no agreement exists; and generate mutually compatible avoidance plans for operators that satisfy maneuverability, temporal, and agreement-related constraints to minimize the probability of collision between the objects involved in the conjunction. Thus, the computer system can facilitate communication and formal operative agreements between satellite operators while autonomously resolving orbital conjunction events between satellites.

For example, the computer system can, within seconds of receiving a conjunction data message from a space object tracking system—(such as the space surveillance network operated by US Space Command): identify satellite operators involved in the conjunction; and host a conversation via a digital medium (e.g., via cooperative messaging application or an internal messaging application). By automatically connecting two satellite operators involved in a conjunction, the computer system reduces the time required to coordinate orbital maneuvers to minimize the probability of collision, thereby expanding the space of effective avoidance maneuvers.

In another example, the computer system can, upon identifying two operators of satellites involved in conjunction, identify whether the two operatives are currently party to an operative agreement constraining maneuvering options available to either or both operators. In response to identifying that an agreement between operators does not exist, the computer system can generate a potential agreement based on known capabilities of each party. By proposing an agreement, the computer system can further reduce the time required to negotiate an agreement consistent with the maneuverability and sensing capabilities of each operator, thereby reducing the time required to coordinate orbital maneuvers to minimize the probability of collision.

In yet another example, upon identifying maneuverability and agreement-related constraints for one or both satellites involved in a conjunction, the computer system can generate an avoidance plan including multiple avoidance maneuvers for each satellite involved in the conjunction. The computer system can generate cooperative avoidance plans, such that each operator can select any of the presented avoidance maneuvers without conflicting with an avoidance maneuver presented to the other operator. Thus, the computer system can prevent errors in communication between the operators from inadvertently increasing the probability of collision between two satellites.

9.2 Predicting Atmospheric Density

In one variation, an entity can access a series of data on the network to derive an atmospheric density for a satellite associated with the entity to predict a future atmospheric drag force on another satellite traversing the same atmospheric region based on the derived atmospheric density. In particular, in this implementation, at an entity, the computer system can: receive a first authentic data package from a first database, the first authentic data package originating from a first entity; extract a first set of satellite coordinates, corresponding to a first satellite, from the first authentic data package; extract a second authentic data package from the first data package, the second authentic data package originating from a second entity; and extract a second set of satellite coordinates, corresponding to a second satellite, from the second authentic data package. Then, the computer system can: extract a first series of mission data of the first satellite from the first set of satellite coordinates, the first series of mission data representing the first satellite traversing a first are of a first orbit, on a first orbital path corresponding to a first altitude, at a first attitude; extract a second series of mission data of the first satellite from the first set of satellite coordinates, the second series of mission data representing the first satellite traversing a second are of the first orbit, adjacent and succeeding the first are, at a second attitude; access a first virtual representation of the first satellite; calculate a first frontal area of the first satellite traversing the first are of the first orbit based on the first virtual representation of the first satellite and the first attitude; calculate a second frontal area of the first satellite traversing the second are of the first orbit based on the first virtual representation of the first satellite and the second attitude; calculate a first average atmospheric density across a first composite are, including the first are and the second are, on the first orbital path based on the first series of mission data, the second series of mission data, the first frontal area, and the second frontal area; and generate an atmospheric density gradient map representing the first average atmospheric density proximal the first composite are of the first orbital path at the first altitude. For a third satellite traversing the first composite are of the first orbital path at the first altitude, the computer system can: predict a future location of the second satellite based on the atmospheric density gradient map; and store the future location of the second satellite in a database associated with the entity.

In one example, the computer system can implement the network to: access a schedule of preplanned attitude changes within a population of satellites; request pre- and post-attitude-change telemetry data from these satellites; derive atmospheric densities within select atmospheric regions based on telemetry data; and then opportunistically update atmospheric densities in the current atmospheric density model to reflect these new derived atmospheric densities.

In another example, the computer system can: access mission data from a population of satellites (e.g., 1000 satellites) orbiting the Earth to actively schedule attitude changes within a population of satellites in order to generate satellite mission data from which the system can derive atmospheric densities within select atmospheric regions; and then update oldest atmospheric densities in an atmospheric density model to reflect these new derived atmospheric densities. Thus, the system collects mission data to generate and update an atmospheric density model to reflect improved accuracy drag-coefficient data.

In another example, the computer system can: access mission data from a population of satellites (e.g., 1000 satellites) orbiting the Earth to frequently update the atmospheric density gradient map (e.g., re-calculate a density value of a region of the atmosphere once per minute). The system can additionally access data from unused and/or retired satellites (e.g., satellites that no longer perform the initially intended function but still communicate mission data to systems on Earth) to increase the set of usable data for the atmospheric density gradient map. Therefore, the network can allow a particular entity to generate and maintain an atmospheric density gradient map with updated data to enable accurate satellite trajectory calculations.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

The invention claimed is:

1. A method comprising, at an entity:

serving a first query to a first database comprising a corpus of satellite data;

receiving a first data package from the first database, the first data package originating from a first entity;

retrieving a first public decryption key associated with the first entity;

attempting decryption of the first data package via the first public decryption key; and in response to the first public decryption key decrypting the first data package:

identifying the first data package as authenticated;

extracting a second data package from the first data package, the second data package originating from a second entity;

retrieving a second public decryption key associated with the second entity;

attempting decryption of the second data package via the second public decryption key;

in response to the second public decryption key failing to decrypt the second data package:

identifying the second data package as unauthenticated; and discarding the second data package;

extracting a third data package from the first data package, the third data package originating from a third entity;

retrieving a third public decryption key associated with the third entity;

attempting decryption of the third data package via the third public decryption key;

in response to the third public decryption key decrypting the third data package:

identifying the third data package as authenticated; and extracting a first set of satellite coordinates, corresponding to a first satellite, from the third data package; and updating a virtual representation of positions and velocities of a constellation of orbital satellites according to the first set of satellite coordinates and exclusive of data contained in the second data package.

2. The method of claim 1, further comprising, at the entity:

accessing a set of satellite coordinates corresponding to a satellite associated with the entity;

encrypting a data package via a private encryption key associated with the entity, the data package comprising:

the third data package identified as authenticated; and the set of satellite coordinates corresponding to the satellite; and storing the data package in a database associated with the entity.

3. The method of claim 2, further comprising, at a fourth entity:

receiving a second query, for the set of satellite coordinates corresponding to the satellite, from a fifth entity; and in response to absence of the set of satellite coordinates in a fourth database associated with the fourth entity:

serving a third query, for the set of satellite coordinates, to the database, associated with the entity;

receiving the data package from the database associated with the entity;

retrieving a public decryption key associated with the entity;

attempting decryption of the data package via the public decryption key;

in response to the public decryption key decrypting the data package:

identifying the data package as authenticated;

extracting the set of satellite coordinates, corresponding to the satellite, from the data package; and encrypting a fourth data package via a fourth private encryption key, the fourth data package comprising the data package identified as authenticated; and transmitting the fourth data package to the fifth entity.

4. The method of claim 2, further comprising:

at the entity:

encrypting a data package via a private encryption key associated with the entity, the data package comprising the second data package identified as unauthenticated; and transmitting the data package to the third entity; and at the third entity:

receiving the data package from a database associated with the entity;

retrieving a public decryption key associated with the entity;

attempting decryption of the data package via the public decryption key; and in response to the public decryption key decrypting the data package:

identifying the data package as authenticated;

extracting the second data package, labeled as unauthenticated, from the data package;

retrieving the second public decryption key associated with the second entity;

attempting decryption of the second data package via the second public decryption key; and in response to the second public decryption key failing to decrypt the second data package:

identifying the second data package as authenticated;

encrypting a fourth data package via a third private encryption key associated with the third entity, the fourth data package comprising the second data package labeled as authenticated; and transmitting the fourth data package to the entity.

5. A method comprising, at an entity:

serving a first query to a first database comprising a corpus of satellite data;

receiving a first data package from the first database, the first data package originating from a first entity;

retrieving a first public decryption key associated with the first entity;

attempting decryption of the first data package via the first public decryption key; and in response to the first public decryption key decrypting the first data package:

identifying the first data package as authenticated;

extracting a first set of satellite coordinates, corresponding to a first satellite, from the first data package;

extracting a second data package from the first data package, the second data package originating from a second entity;

retrieving a second public decryption key associated with the second entity;

attempting decryption of the second data package via the second public decryption key;

in response to the second public decryption key decrypting the second data package:

identifying the second data package as authenticated; and extracting a second set of satellite coordinates, corresponding to a second satellite, from the second data package; and updating a virtual representation of positions and velocities of a first constellation of orbital satellites according to the first set of satellite coordinates and the second set of satellite coordinates.

6. The method of claim 5:

wherein updating the virtual representation comprises updating a visual representation of positions and velocities of the first constellation of orbital satellites according to the first set of satellite coordinates and the second set of satellite coordinates.

7. The method of claim 5:

wherein updating the virtual representation comprises updating a population of orbits of positions, velocities, attitudes, altitudes, and elliptical paths of the first constellation of orbital satellites according to the first set of satellite coordinates and the second set of satellite coordinates.

8. The method of claim 5, wherein extracting the first set of satellite coordinates from the first data package comprises:

in response to the first public decryption key decrypting the first data package, extracting a third data package from the first data package, the third data package originating from the first entity;

attempting decryption of the third data package via the first public decryption key associated with the first entity; and in response to the first public decryption key decrypting the third data package:

identifying the third data package as authenticated; and extracting the first set of satellite coordinates, corresponding to the first satellite, from the third data package.

9. The method of claim 5:

further comprising, at the entity:

retrieving a first confidence score for the first set of satellite coordinates; and retrieving a second confidence score for the second set of satellite coordinates, the second confidence score less than the first confidence score; and wherein updating the virtual representation comprises:

calculating a first radius proportional to the first confidence score;

calculating a second radius proportional to the second confidence score, the second radius greater the first radius;

defining a first zone, characterized by the first radius and representing possible locations of the first satellite, in the virtual representation; and defining a second zone, characterized by the second radius and representing possible locations of the second satellite, in the virtual representation.

10. The method of claim 9:

further comprising, at the entity:

in response to the first public decryption key decrypting the first data package:

retrieving a first trust score assigned to the first entity by the entity; and extracting a second trust score for the second set of satellite coordinates from the first data package, the second trust score calculated by the first entity, associated with the second data package, and stored in the first data package;

wherein retrieving the first confidence score comprises calculating the first confidence score based on the first trust score; and wherein retrieving the second confidence score comprises calculating the second confidence score based on a combination of the first trust score and the second trust score.

11. The method of claim 5:

further comprising, at the entity:

at a first time:

serving an initial query to the first database;

receiving an initial data package from the first database;

retrieving the first public decryption key associated with the first entity;

attempting decryption of the initial data package via the first public decryption key; and in response to the first public decryption key decrypting the initial data package:

identifying the initial data package as authenticated; and extracting an initial set of satellite coordinates, corresponding to an initial predicted location of the first satellite at an initial time succeeding the first time, from the initial data package;

accessing a verified location of the first satellite at the initial time;

calculating a first trust score based on a difference between the initial predicted location and the verified location; and assigning the first trust score to the first entity;

wherein serving the first query to the first database comprises serving the first query to the first database at a second time succeeding the first time;

wherein extracting the first set of satellite coordinates from the first data package comprises extracting the first set of satellite coordinates, corresponding to a first predicted location of the first satellite at a third time succeeding the second time, from the first data package; and wherein updating the virtual representation comprises:

calculating a first radius proportional to the first trust score; and defining a first zone, characterized by the first radius and representing possible locations of the first satellite around the first predicted location of the first satellite at the first time, in the virtual representation.

12. The method of claim 5:

wherein extracting the first set of satellite coordinates comprises extracting:

a first specified past location of the first satellite at a first time; and a first specified future location of the first satellite at a second time; and further comprising, at the entity:

accessing a first actual past location proximal the first time;

calculating a first confidence score based on a first difference between the first specified past location and the first actual past location;

encrypting a third data package via a private encryption key associated with the entity, the third data package comprising the first set of satellite coordinates associated with the first confidence score; and storing the third data package in a database associated with the entity for access by a population of entities.

13. The method of claim 12, wherein updating the virtual representation comprises:

calculating a first radius proportional to the first difference; and defining a first zone, exhibiting the first radius and representing possible locations of the first satellite, in the virtual representation.

14. The method of claim 5:

further comprising, at the entity:

serving a second query to a fourth database;

receiving a fourth data package from the fourth database, the fourth data package originating from a fourth entity;

retrieving a fourth public decryption key associated with the fourth entity;

attempting decryption of the fourth data package via the fourth public decryption key; and in response to the fourth public decryption key decrypting the fourth data package:

identifying the fourth data package as authenticated; and extracting the first set of satellite coordinates, corresponding to the first satellite, from the fourth data package;

further comprising:

calculating a first rarity score for the first set of satellite coordinates based on:

presence of the first set of satellite coordinates in the first data package; and presence of the first set of satellite coordinates in the fourth data package; and calculating a second rarity score, less than the first rarity score, for the second set of satellite coordinates based on:

presence of the first set of satellite coordinates in the first data package; and absence of the second set of satellite coordinates in the fourth data package; and wherein updating the virtual representation comprises:

calculating a first radius proportional to the first rarity score;

calculating a second radius proportional to the second rarity score;

defining a first zone, exhibiting the first radius and representing possible locations of the first satellite, in the virtual representation; and defining a second zone, exhibiting the second radius and representing possible locations of the second satellite, in the virtual representation.

15. The method of claim 5, further comprising, at the entity:

serving a second query to a third database comprising a corpus of satellite data;

receiving a third data package from the third database, the third data package originating from a third entity;

retrieving a third public decryption key associated with the third entity;

attempting decryption of the third data package via the third public decryption key;

in response to the third public decryption key decrypting the third data package:

identifying the third data package as authenticated; and extracting a third set of satellite coordinates from the third data package; and in response to disjoint between sets of satellite coordinates stored in the first database and the third database, appending the first database and the third database to a query list.

16. The method of claim 15, further comprising, at the entity:

in response to the third public decryption key decrypting the third data package:

extracting a fourth set of satellite coordinates, corresponding to a fourth satellite, from the third data package;

serving a third query to a fourth database comprising a corpus of satellite data;

receiving a fourth data package from the fourth database, the fourth data package originating from a fourth entity;

retrieving a fourth public decryption key associated with the fourth entity;

attempting decryption of the fourth data package via the fourth public decryption key;

in response to the fourth public decryption key decrypting the fourth data package:

identifying the fourth data package as authenticated; and extracting the fourth set of satellite coordinates, corresponding to the fourth satellite, from the fourth data package; and in response to the first data package fully containing satellite coordinates contained within the second data package:

excluding the fourth database from the query list.

17. The method of claim 5, further comprising, at the entity:

accessing a requester whitelist comprising a list of trusted entities;

accessing a requester blacklist comprising a list of untrusted entities;

receiving a second query, for a third set of satellite coordinates and a fourth set of satellite coordinates, from the first entity;

in response to presence of the first entity on the requester whitelist:

accessing a first clearance level assigned to the first entity and defined in the list of trusted entities;

in response to the first clearance level exceeding a threshold clearance level, encrypting a data package via a private encryption key associated with the entity, the data package comprising the third set of satellite coordinates and the fourth set of satellite coordinates; and transmitting the data package to the first entity;

receiving a third query, for the third set of satellite coordinates and the fourth set of satellite coordinates, from the second entity;

in response to presence of the second entity on the requester whitelist:

accessing a second clearance level assigned to the second entity and defined in the list of trusted entities;

in response to the second clearance level falling below the threshold clearance level, encrypting the data package via the private encryption key associated with the entity, the data package comprising the third set of satellite coordinates; and transmitting the data package to the second entity;

receiving a fourth query from a third entity; and in response to presence of the third entity on the requester blacklist, denying the fourth query.

18. The method of claim 5, further comprising, at the entity:

forecasting an intersection between a future flight path defined for the first satellite and a zone representing possible locations of the second satellite at a future time based on the first set of satellite coordinates and the second set of satellite coordinates; and in response to the probability of collision exceeding a threshold probability of collision:

notifying a first satellite operator associated with the first satellite of the probability of collision;

notifying a second satellite operator associated with the second satellite of the probability of collision;

accessing an agreement record for a set of satellite operators comprising the first satellite operator and the second satellite operator;

in response to detecting that no agreement exists between the first satellite operator and the second satellite operator, generating an operative agreement based on a first set of satellite characteristics and a second set of satellite characteristics and transmitting an agreement message comprising a tentative agreement and an acceptance element to the first satellite operator and the second satellite operator; and in response to acceptance of the operative agreement by the first satellite operator and the second satellite operator via the acceptance element:

generating a first avoidance plan for the first satellite comprising a first set of avoidance maneuvers;

generating a second avoidance plan for the second satellite comprising a second set of avoidance maneuvers;

transmitting the first avoidance plan to the first satellite operator; and transmitting the second avoidance plan to the second satellite operator.

19. The method of claim 5, further comprising:

at the entity:

extracting a first series of mission data of the first satellite from the first set of satellite coordinates, the first series of mission data representing the first satellite traversing a first are of a first orbit, on a first orbital path corresponding to a first altitude, at a first attitude;

accessing a second series of mission data of the first satellite from the first set of satellite coordinates, the second series of mission data representing the first satellite traversing a second are of the first orbit, adjacent and succeeding the first are, at a second attitude;

accessing a first virtual representation of the first satellite;

calculating a first frontal area of the first satellite traversing the first are of the first orbit based on the first virtual representation of the first satellite and the first attitude;

calculating a second frontal area of the first satellite traversing the second are of the first orbit based on the first virtual representation of the first satellite and the second attitude;

calculating a first average atmospheric density across a first composite are, comprising the first are and the second are, on the first orbital path based on the first series of mission data, the second series of mission data, the first frontal area, and the second frontal area; and generating an atmospheric density gradient map representing the first average atmospheric density proximal the first composite are of the first orbital path at the first altitude; and for a third satellite traversing the first composite are of the first orbital path at the first altitude:

predicting a future location of the second satellite based on the atmospheric density gradient map; and storing the future location of the second satellite in a database associated with the entity.

20. A method comprising, at an entity:

receiving a first data package from a first database the first data package originating from a first entity;

attempting decryption of the first data package via a first public decryption key associated with the first entity; and in response to the first public decryption key decrypting the first data package:

extracting a second data package from the first data package, the second data package originating from a second entity;

attempting decryption of the second data package via a second public decryption key associated with the second entity;

in response to the second public decryption key failing to decrypt the second data package, discarding the second data package;

extracting a third data package from the first data package, the third data package originating from a third entity;

attempting decryption of the third data package via a third public decryption key associated with the third entity;

in response to the third public decryption key decrypting the third data package, extracting a set of satellite coordinates, corresponding to a satellite, from the third data package; and updating a virtual representation of positions and velocities of a constellation of orbital satellites according to the set of satellite coordinates.

* * * * *